United States Patent
Bhattacharyya et al.

(10) Patent No.: US 8,627,340 B2
(45) Date of Patent: *Jan. 7, 2014

(54) MANAGING EVENTS GENERATED FROM BUSINESS OBJECTS

(75) Inventors: Anamitra Bhattacharyya, Chelmsford, MA (US); Boris Dozortsev, Newton, MA (US); Thomas John Sarasin, Fitchburg, MA (US)

(73) Assignee: International Business Machines Corporation, Armonk, NY (US)

( * ) Notice: Subject to any disclaimer, the term of this patent is extended or adjusted under 35 U.S.C. 154(b) by 201 days.

This patent is subject to a terminal disclaimer.

(21) Appl. No.: 13/166,947

(22) Filed: Jun. 23, 2011

(65) Prior Publication Data

US 2012/0331486 A1  Dec. 27, 2012

(51) Int. Cl.
*G06F 9/54* (2006.01)

(52) U.S. Cl.
USPC ...................................................... 719/318

(58) Field of Classification Search
USPC ...................................................... 719/318
See application file for complete search history.

(56) References Cited

U.S. PATENT DOCUMENTS

| 6,363,435 | B1 | 3/2002 | Fernando et al. | |
|---|---|---|---|---|
| 7,590,640 | B2 | 9/2009 | Wolber et al. | |
| 2002/0077929 | A1* | 6/2002 | Knorr et al. | 705/26 |
| 2006/0070083 | A1* | 3/2006 | Brunswig et al. | 719/318 |
| 2007/0288891 | A1 | 12/2007 | Aakolk et al. | |
| 2008/0046259 | A1 | 2/2008 | Johnston | |
| 2008/0065443 | A1 | 3/2008 | Gorur et al. | |
| 2008/0184266 | A1 | 7/2008 | Bornhoved et al. | |
| 2009/0007146 | A1* | 1/2009 | Hunsinger et al. | 719/318 |
| 2009/0059941 | A1* | 3/2009 | Callaway et al. | 370/412 |
| 2009/0138294 | A1 | 5/2009 | Kumaran et al. | |
| 2010/0023339 | A1 | 1/2010 | Baeuerle et al. | |
| 2010/0122270 | A1* | 5/2010 | Lin | 719/318 |
| 2010/0161676 | A1 | 6/2010 | Kazmaier et al. | |
| 2010/0179847 | A1 | 7/2010 | Cope et al. | |
| 2010/0251264 | A1 | 9/2010 | McGuire et al. | |
| 2011/0218927 | A1* | 9/2011 | Addala et al. | 705/301 |
| 2012/0124584 | A1* | 5/2012 | Addala et al. | 718/102 |

OTHER PUBLICATIONS

Cibrán, M.A.; D'Hondt, M.; Jonckers, V., "Aspect-Oriented Programming for Connecting Business Rules," In Proceedings of BIS International Conference, Colorado Springs, USA, Jun. 2003, pp. 1-10.*

(Continued)

*Primary Examiner* — H S Sough
*Assistant Examiner* — Brian W Wathen
(74) *Attorney, Agent, or Firm* — Garg Law Firm, PLLC; Rakesh Garg; John Flynn

(57) ABSTRACT

A method, system, and computer program product for managing events generated from business objects in a business transactions environment are provided in the illustrative embodiments. A first event being raised by a business object in a plurality of business objects configured in a business entity is detected. The business entity executes in the data processing system and provides a function for processing a request. A determination is made whether a second event has been detected prior to the first event and during the processing of the request. In response to the determining being affirmative, first event data associated with the first event is combined with second event data stored from the second event. The combining results in consolidated event data. The consolidated event data is published in response to the request upon completing the processing of the request.

20 Claims, 6 Drawing Sheets

(56) References Cited

OTHER PUBLICATIONS

IBM et al.; "Method to Preserve Context Associated with Business Data Property Copied Intra Business Graph", IPCOM000167124D, Jan. 31, 2008.

IBM et al.; "Method to Preserve Context Associated with Business Data Property Copied Inter Business Graph", IPCOM000167123D, Jan. 31, 2008.

Decker et al.; "A Graphical Notation for Modeling Complex Events in Business Processes", EDOC 11th IEEE Inter. Conf. on, Oct. 15-19, 2007, pp. 27-36.

Buss et al.; "Building Complex Models with LEGOs (Listener Event Graph Objects)", Proceedings of The Winter, Dec. 8-11, 2002, pp. 732-737.

* cited by examiner

MANAGING EVENTS GENERATED FROM BUSINESS OBJECTS

TECHNICAL FIELD

The present invention relates generally to a computer implemented method, system, and computer program product for processing business transactions. More particularly, the present invention relates to a computer implemented method, system, and computer program product for managing events generated from business objects participating in a business transaction.

BACKGROUND

Software applications interact with each other in a data processing environment for processing business transactions. A business transaction is a request for performing an operation, with or without a corresponding response. Typically, such a request is for an operation relative to data maintained for a business purpose.

For example, a purchase order entry application may send a request for getting a purchase order approved to another application that may implement a purchase order approval process. As another example, a scheduler application may send a request to begin processing the purchase orders for the day to another application that may implement a batch process for submitting and processing purchase orders.

An application for processing a business transaction usually depends on a collection (cloud) of Business Objects (BO). A business object is a combination of code and data that provides certain functionality that is useful in processing a business transaction. Several business objects can interact with each other, such as in a cloud, to provide more complex business functions. A cloud of business objects may be configured to offer particular functions or services intended to be offered by the application.

SUMMARY

The illustrative embodiments provide a method, system, and computer program product for managing events generated from business objects.

An embodiment detects a first event, the first event being raised by a business object in a plurality of business objects configured in a business entity. The business entity executes in the data processing system and provides a function for processing a request. The embodiment determines whether a second event has been detected prior to the event and during the processing of the request. The embodiment, responsive to the determining being affirmative, combines a first event data associated with the event with a second event data stored from the second event, the combining resulting in consolidated event data. The embodiment publishes the consolidated event data responsive to the request upon completing processing of the request.

In another embodiment, changing of transaction data due to the request gives rise to the first event, and the first event includes the transaction data in a changed state subsequent to the changing.

In another embodiment, the detecting the first event further includes associating a listener with the business object in the business entity. The embodiment uniquely identifies the business object in the business entity to the listener.

Another embodiment further configures the business object as an active business object, the active business object being permitted to raise events. The embodiment configures a second business object in the plurality of business objects as a passive business object, the passive business object being prevented from raising events.

In another embodiment, the business object in the plurality of business objects is not configured to propagate the first event via a parent-child relationship with a second business object. The business object raises the first event upon detecting a change in transaction data associated with the request as a result of a processing of the request by the business object.

In another embodiment, the determining whether a second event has been detected is performed by referring an event flag.

In another embodiment, the event flag is maintained relative to a root business object of a hierarchy of the plurality of business objects in the business entity.

In another embodiment, the event flag is maintained relative to a child business object in the hierarchy. In the embodiment, the event flag registers only those events that arise from those business objects that appear in a sub-graph below the child business object in the hierarchy.

In another embodiment, the event flag is a non-persisted property of the root business object.

In another embodiment, the combining results in merging a first change in the transaction data that caused the first event with a second change in the transaction data that caused the second event.

In another embodiment, the business object participates in a second business entity. The embodiment further checks whether the first event is raised by the business object in the business entity. The embodiment ignores the first event and omits the combining responsive to the first event being raised by the business object in the second business entity.

Another embodiment further categorizes the first event into one of a plurality of categories. In the embodiment, the combining results in a categorized consolidated event data by merging a first change in the transaction data that caused the first event with a second change in the transaction data that caused the second event such that the first event and the second event are in a common category.

In another embodiment, the publishing includes publishing the categorized consolidated event data for each such category in the plurality of categories that includes at least one event during the processing of the request.

BRIEF DESCRIPTION OF THE SEVERAL VIEWS OF THE DRAWINGS

The novel features believed characteristic of the embodiments of the invention are set forth in the appended claims. An embodiment of the invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
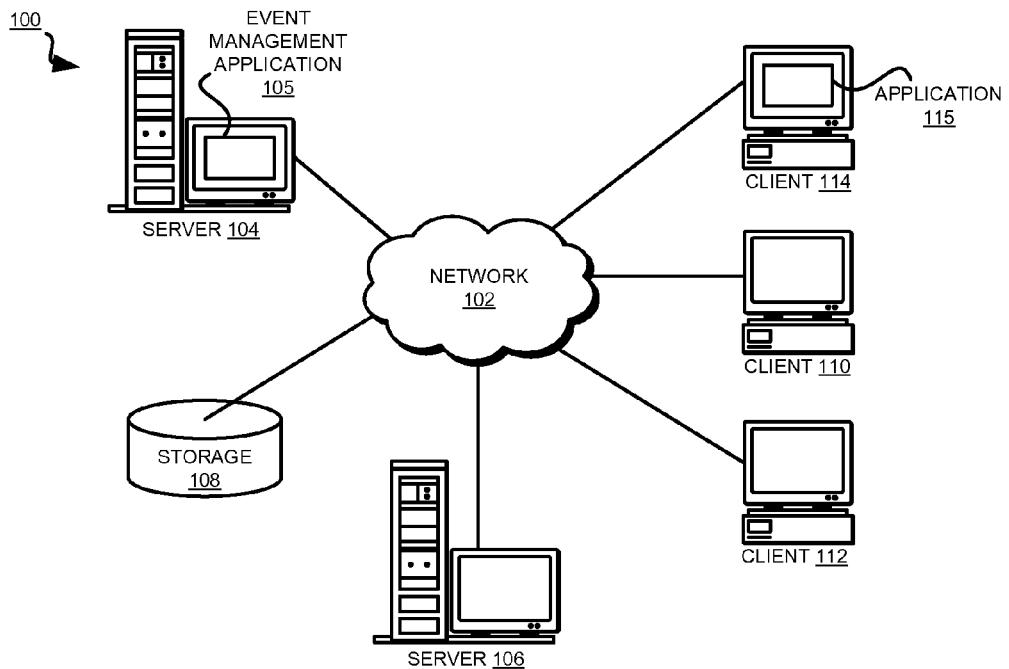
FIG. 1 pictorial representation of a network of data processing systems in which illustrative embodiments may be implemented.

The business objects can be configured into groups or clouds by establishing relationships between the objects. A Business Entity (BE) is a logical grouping of business objects in which a business object has a relationship with another business object. For example, one object may be in a parent-child relationship with another business object and the child business object may provide additional functionality over the functionality of the parent business object, or specialize a functionality provided by the parent business object.

A business entity represents an atomic business object for another application, such as a software application that consumes the functionality, data, or services provided by the business entity. In essence, a business entity is a virtual business object to the consumer and is represented by a graph of related business objects within the application platform. Some examples of a business entity are purchase order, a work order, an asset, or inventory, represented as a graph of relationships amongst business objects that encapsulate certain parts of the purchase order, a work order, an asset, or inventory respectively.

For example, a Work Management business entity might include a graph of related business objects such as a work order business object, a job plan business object, planned material business object, and inventory reservations business object. Each of these example business objects is configured for providing a specific functionality within the work management business entity. Another application—a consumer application—may consume or use the work management business entity's work management functionality. From the point of view of the consumer application, the work management functionality appears to be provided by the work management business entity as a whole. The consumer application does not know or does not have to know the individual business objects that make up the work management business entity.

A consumer application sends a request to a business entity or a business entity configured within another application. The embodiments of the invention recognize that a consumer application often has to be notified of changes to the business entity resulting from the request. Particularly, the consumer application is interested in listening to events from the graph of business objects in the business entity as a whole and does want to know which specific business object triggered which specific event. An event is a change in data related to the request as a result of the request.

A business entity can be configured by selecting some business objects from a collection of business objects, and relating the selected business objects with one another in a hierarchical graph. The selection of business objects and the structure of the graph can be customized for the functionality contemplated from the business entity being designed, the business objects in the business entity cannot know in advance to which business entities or parent business objects they will belong. Often, the same business object will, simultaneously, or a different times, belong to different business entities and appear in different positions within the same or different graphs.

Thus, the embodiments of the invention recognize that a business object cannot be designed to provide a mechanism to contact a known parent business object when the state of the data changes at the business object. In other words, when a business object triggers an event, to with, a change of state of the data being manipulated by the business object, the business object cannot communicate the event up a given hierarchy by any parent-child communication mechanism for propagating events in a business entity.

Each business object in a business entity is a potential source of events. Sometimes, multiple instances of a common business object are present in a business entity, giving rise to the possibility that the same event will be generated by multiple instances of the business object under certain circumstances.

When a consumer application is notified of an event, the changed data that caused the event is supplied with the notification. In case of multiple events from the same business entity, and in the case where many business objects raise the same event, the consumer application is inundated with duplicative data.

The embodiments of the invention recognize that a typical consumer application in a business transaction processing environment is interested in a reduced number of events, and particularly in those events that communicate distinct state changes of the associated data.

Some prior art methods address this problem, by providing triggers on the business objects. However, no easy way exists to coordinate the trigger processing when more than one business objects within a business entity initiate the event. Without a complex mechanism to manage triggers, multiple events are initiated for the business entity, giving rise to the problem of the consumer application receiving multiple events, as recognized by the embodiments of the invention.

The illustrative embodiments used to describe the invention generally address and solve the above-described problems and other problems related to communicating events from business entities to consumer applications. The illustrative embodiments provide a method, system, and computer program product for managing events generated from business objects in a business transactions environment.

Generally, the illustrative embodiments provide a mechanism to limit the number of events being communicated from a business entity to a consumer application by consolidating certain events together before communicating the consolidated event to the consumer application.

In one example configuration, an event management application according to an illustrative embodiment may consolidate all events arising during the processing of a request, and communicate the single consolidated event to the consumer application that originated the request. Operating in such a configuration, the event management application of an embodiment reduces the number of events begin communicated or published to the consumer application from many to one. The reduction is effective regardless of the number of business objects in the business entity that experience a change in the state of the data they may be processing responsive to the request.

In another example configuration, an event management application according to an embodiment may categorize the events from the various business objects in a given business entity into different categories. The example configuration may then consolidate the events of each category into a single consolidated event. The example configuration may then send the consolidated events from the various categories to the consumer application. Operating in such a configuration, the event management application of an embodiment reduces the number of events being communicated or published to the consumer application from many separate events to one consolidated event for each category of events.

The event management application also addresses the case when an event from a single business object initiates multiple events. For example, an event generated by a business object—a business object event—can give rise to multiple events at the business entity level—a business entity event—such as when the business object participates in more than one business entity. As another example, multiple instances of the same business object, using different relationships with other objects, may exist within one business entity. Different instances of the same business object may initiate multiple events of the same type under certain circumstances.

The event management application according to the illustrative embodiments further supports a flexible configuration option whereby an application may choose to turn on, or off, the event generation capabilities for individual business objects within the graph. For example, an administration application may designate some business objects as active and some as passive during the configuration of a business entity. An active business object or an instance thereof is a business object or an instance thereof that can generate events. A passive business object or an instance thereof is a business object or an instance thereof that is prevented from generating events.

The illustrative embodiments are described with respect to certain data and data structures only as examples. Such descriptions are not intended to be limiting on the embodiments of the invention. For example, an illustrative embodiment described with respect to a flag can be implemented using a separate data structure in memory, a non-persisted property of an existing business object, or any other suitable structure for holding a flag value within the scope of the embodiments of the invention.

Furthermore, the illustrative embodiments may be implemented with respect to any type of data, data source, or access to a data source over a data network. Any type of data storage device may provide the data, such as a boot image, to an embodiment of the invention, either locally at a data processing system or over a data network, within the scope of the embodiments of the invention.

The illustrative embodiments are further described with respect to certain applications only as examples. Such descriptions are not intended to be limiting on the embodiments of the invention. An embodiment of the invention may be implemented with respect to any type of application, such as, for example, applications that are served, the instances of any type of server application, a platform application, a standalone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which an embodiment of the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
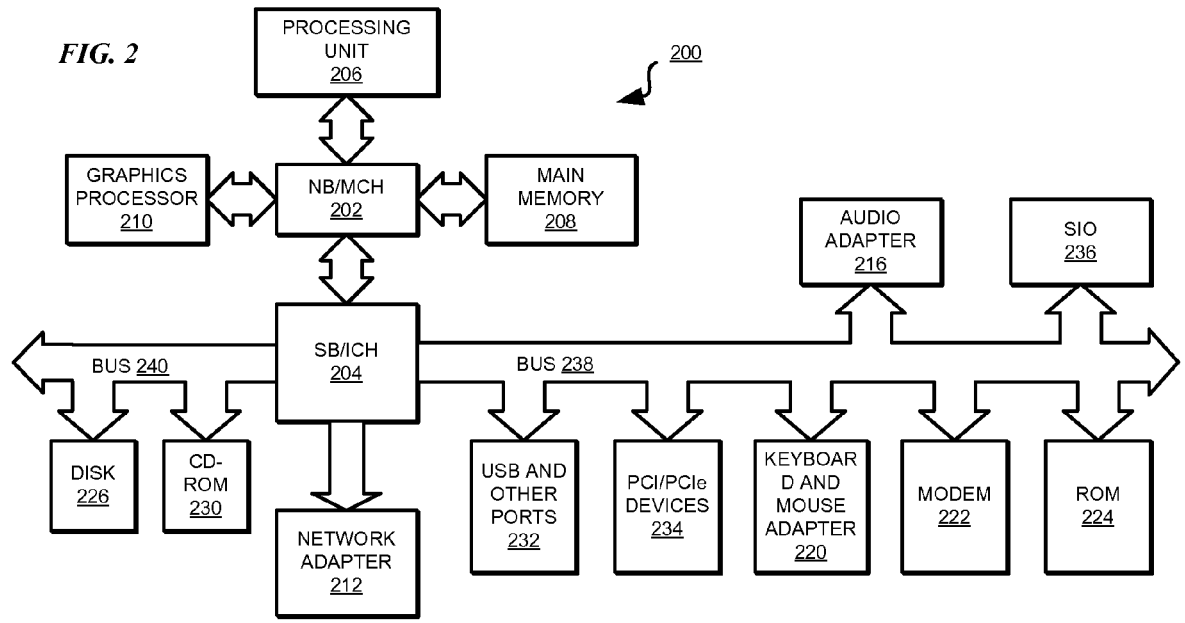
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Any data processing system, such as client 114, may include application 115 that may act as a consumer application. Any data processing system, such as server 104, may include an event management application, such as event management application 105. Event management application 105 may operate in conjunction with a business entity (not shown) that may execute in any data processing system and generate the events that event management application 105 consolidates.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Generally, a business entity definition establishes the business objects that are part of the business entity and the manner in which the business objects are related to each other. A business object-to-business entity is a many to many relationship. A business object is unaware of the fact that it is a part of a business entity. Only the business entity knows which business objects are included in the business entity. A business entity has a common root business object. The root business object is configured as an active business object. A business object has a name which is unique across the business object name space for a given business transactions environment. A business entity has a name which is unique across the business entity name space for a given business transactions environment. A business object is capable of generating events when created, updated, or deleted.

There is no guaranteed order in which a business object would trigger an event compared to other business objects that are part of the same business entity. For example, in one case, a parent business object can raise an event before a child business object, and in a different situation the order might be reversed. Two Business objects may have one or more named relations between them. A relation name is unique only in the context of the two business objects it is relating. Each business object in a business entity can be reached from all other business objects in the same business entity. Business Entity Runtime, to with, the business transactions environment, includes multiple graphs of shared business objects co-existing in the application runtime space.

Figure 3:
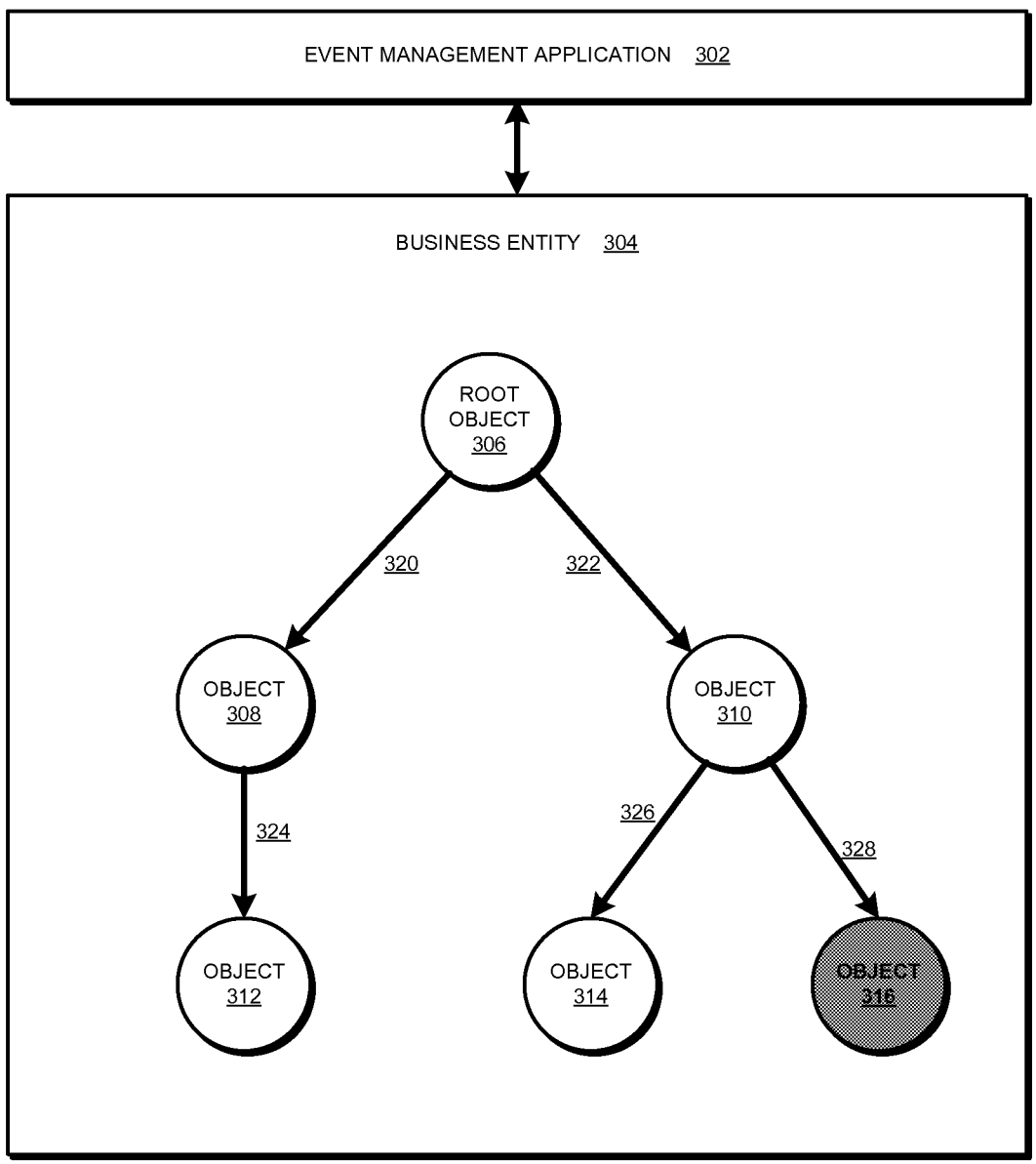
FIG. 3 depicts a block diagram of a configuration to publish consolidated events from business objects in accordance with an illustrative embodiment.

With reference to FIG. 3, this figure depicts a block diagram of a configuration to publish consolidated events from business objects in accordance with an illustrative embodiment. Event management application 302 may be implemented as event management application 105 in FIG. 1. Business entity 304 may be any business entity formed in the manner described above. Root object 306, objects 308, 310, 312, and 314, and object 316 may be business objects of any suitable type, content, or structure without limitation.

For example, root object 306 may be a header object that forms the root of the graph formed by relationships 320, 322, 324, 326, and 328. As an example, and without implying a limitation on the embodiments of the invention, objects 308 and 310 may be two instances of a common business object.

Furthermore, some business objects in business entity 304 may be active and other business objects may be passive. As an example, object 316 may be a passive business object and may not generate events.

Presently, without the benefit of event management application 302, business objects in business entity 304 may generate and publish events independent of each other. For example, during the processing of a request, object 308 may publish an event regardless of whether object 310 is also publishing a similar event. Objects 312 and 314 may publish events irrespective of each other, the events including largely the same data with comparatively small amount of variations.

Furthermore, in some cases, suppressing events from a business object in business entity 304 may be desirable. For example, business object 316 may be a logging object that logs the result of the processing of the request for audit purposes. A consumer application may not be interested in events that are generated as a result of logging activity. However, presently, without the benefit of the ability to set a business object as active or passive as provided by an illustrative embodiment, business entity 304 would also publish events from object 316.

Event management application 302 interacts with business entity 304 to consolidate the events being raised by objects 306, 308, 310, 312, and 314. Event management application 302 also allows configuring object 316 as a passive object during the creation of business entity 304. For example, in one embodiment, event management application 302 may configure object 316 as passive by ignoring the events raised by object 316 and not consolidating or merging those events with the events raised by other business objects in business entity 304. In another example embodiment, event management application 302 may configure object 316 as passive by not associating an event listener with object 316, as is described in further detail with respect to later figures.

Figure 4:
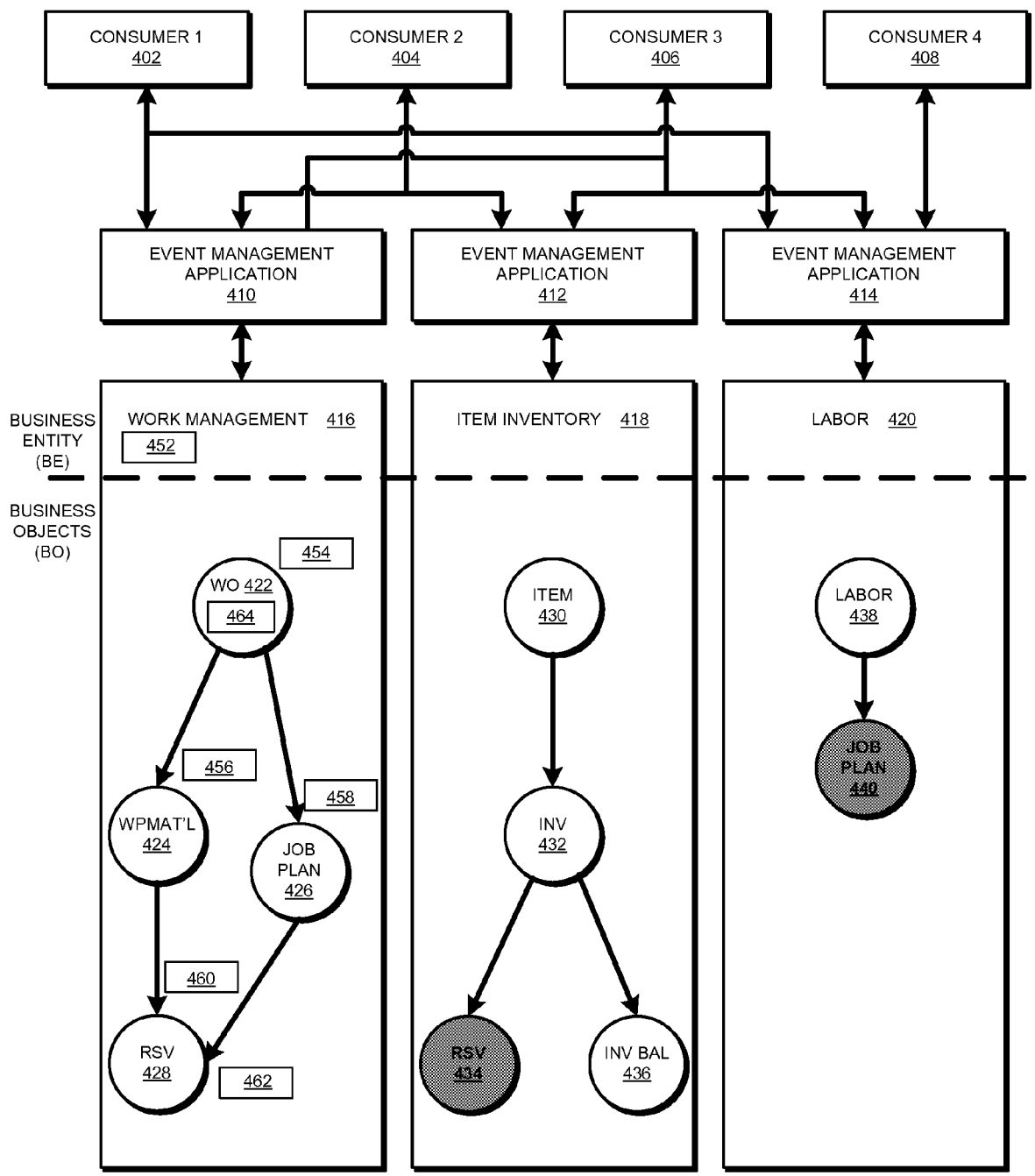
FIG. 4 depicts a block diagram of an example business transaction environment configuration in which events are consolidated from multiple business objects in multiple business entities for multiple consumer applications in accordance with an illustrative embodiment.

With reference to FIG. 4, this figure depicts a block diagram of an example business transaction environment configuration in which events are consolidated from multiple business objects in multiple business entities for multiple consumer applications in accordance with an illustrative embodiment. Consumer applications 402, 404, 406, and 408, labeled "consumer 1", "consumer 2", "consumer 3", and "consumer 4" respectively, may each be analogous to application 115 in FIG. 1.

Event management application 410, 412, and 414 may be one or more instances of an event management application according to an illustrative embodiment that may be configured to consolidate events from one or more business entities. One event management application is shown configured with one business entity in FIG. 4 only as an example and not as a limitation. For example, in an implementation, event management application 410 may be configured to associate with and consolidate events published from business entity 416 as well as business entity 418 within the scope of the embodiments of the invention.

Business entities 416, 418, and 420 may participate in Processing work orders. Business entity 416 may be an example "Work Management" business entity. Business entity 418 may be an example "Item Inventory" business entity. Business entity 420 may be an example "Labor" business entity.

Work management business entity 416 may be configured with work order business object 422, which many be related to work process materials business object 424 and job plan business object 426. Business objects 424 and 426 may in turn be related to inventory reservation business object 428.

As described earlier, a business object may participate in more than one location in a business entity's graph, or in more than one location in more than one business entity graphs. As depicted in FIG. 4's example configuration, item inventory business entity 418 may be configured with item business object 430, which may be related to inventory business object 432. Inventory business object 432 may be related to inventory reservation business object 434 and inventory balance business object 436. RSV business object 434 in business entity 418 may be the same business object as RSV business object 428 in business entity 416, but may be active in business entity 416 and passive in business entity 418.

Similarly, labor business entity 420 may be configured with labor business object 438, which may be related to job plan business object 440. Job plan business object 440 in business entity 420 may be the same business object as job plan business object 426 in business entity 416, but may be active in business entity 416 and passive in business entity 420.

Further features of the operation of the configuration of FIG. 4 are described with respect to business entity 412 only for the clarity of the description. Accordingly, certain components are depicted in business entity 416 and omitted in other business entities for clarity.

Any of consumer applications 402-408 may subscribe to events from any business entity. As depicted, consumer application 402 subscribes to events from business entities 416 and 420. Consumer application 404 subscribes to events from business entities 416 and 418. Consumer application 406 subscribes to events from business entities 416, 418, and 420. Consumer application 408 subscribes to events from business entity 420.

Assume that event management application 410 receives a request for business entity 416 from consumer application 402. Event management application 410 associates listener 452 with business entity 416 to listen for events raised in business entity 416. Event management application 410 may further associate a subscriber identifier identifying consumer application 402 with listener 452. The subscriber identifier is unique within the business transaction environment namespace.

Event management application 410 causes Business entity 416 to in turn associate a listener with each active business object within business entity 416 and identifies them uniquely within business entity 416. A listener associated with a business object is further associated with an object path to the business object and a relation path to the business object to uniquely identify the business object in the graph. For example, listener 454 is associated with business object 422, listener 456 with business object 424, listener 458 with business object 426. Two listeners, 460 and 462, are associated with business object 428 because business object 428 is reachable by using two relationships.

Because a business object can participate in multiple business entities, a business object can have multiple listeners associated there with, one for each business entity and more than one for each business entity if the business object appears more than once in the business entity's graph, as is the case with business object 428 in business entity 416. If inventory reservation business object 434 were active in business entity 418, the inventory reservation business object across business entities 416, 418, and 420 would have three listeners associated therewith—two listeners for the two relationships inventory reservation business object 428 participates in business entity 416, and one for the participation in business entity 418.

Flag 464 in root business object 422 keeps track of whether an active business object in business entity 416 has raised an event during the processing of the current request. Flag 464 may be a data structure in business object 422, a non-persisted property of business object 422, an existing attribute of business object 422 used as a flag, a data structure separate from business object 422's data structure in a memory, or another suitable manner of tracking whether an event has been raised during the processing of the current request.

During the processing of the request from consumer application 402, event management application 410 sets flag 464 at the first event raised by any active business object in business entity 416. Event management application 410 stores the data of the event. For each subsequent event raised by any active business object in business entity 416, in any order, event management application 410 checks whether flag 464 is set, and if set, merges the data of the event with the stored data of previous events. When the processing of the request concludes, event management application 410 publishes the merged data of all the events that were raised in business entity 416 during the processing. The processing of the request may conclude in any manner suitable for an implementation, including but not limited to the request being completely processed, the request processing failing, the request generating a response, the request processing halting, or when the objective of the request has been accomplished.

Figure 5:
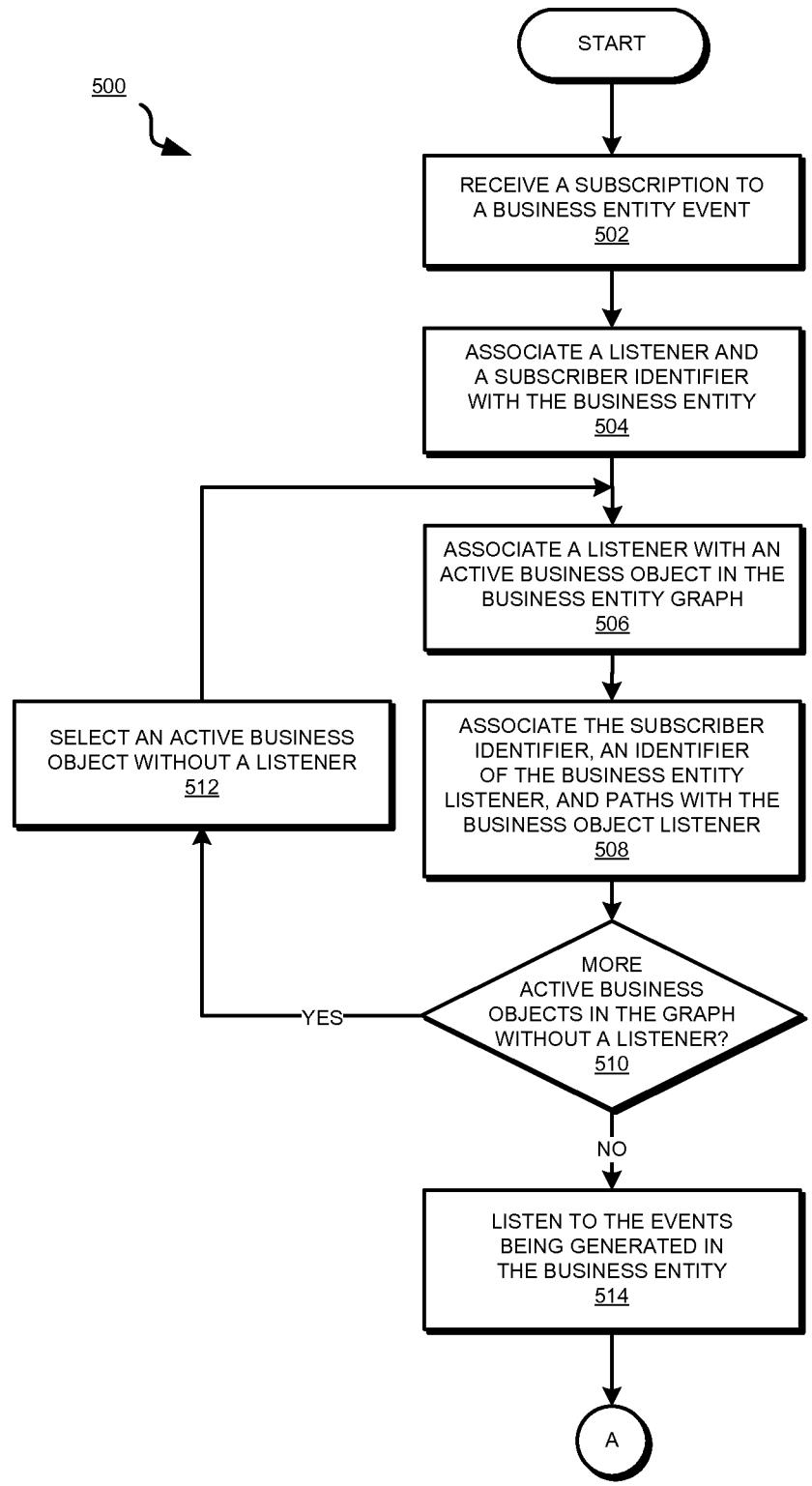
FIG. 5 depicts a flowchart of a process of configuring a business transactions environment for managing events generated from business objects in accordance with an illustrative embodiment.

With reference to FIG. 5, this figure depicts a flowchart of a process of configuring a business transactions environment for managing events generated from business objects in accordance with an illustrative embodiment. Process 500 may be implemented in an event management application, such as event management application 410 in FIG. 4.

Process 500 begins by receiving a subscription to a business entity's events (step 502). As described with respect to FIG. 4, consumer application 402 may send a request to business entity 416 for processing. Sending a request for processing may be treated as one way of subscribing to the business entity's events. Those of ordinary skill in the art will be able to conceive other ways of subscribing to a business entity's events. For example, an administration application may subscribe to the events in all business entity's executing in a business transactions environment without actually sending a business transaction to any business entity.

Process 500 associates a listener with the business entity and associates a subscriber identifier with the listener (step 504). Process 500 associates a listener with an active business object in the business entity's graph (step 506). Process 500 further associates suitable identifiers with the listener of step 506 to uniquely identify the business object and the business entity to whose events the listener is listening (step 508).

For example, process 500 may associate with the listener of a business object the subscriber identifier, an identifier of the business entity, an object path of the business object, and a relationship path of the business object. Note that these identifiers and paths are described in this disclosure as example ways of uniquely identifying a business object, business entity, or a listener. These identifiers and paths are not intended to be limiting on the embodiments of the invention. Those of ordinary skill in the art will be able to conceive many other ways of accomplishing a similar purpose, and the same are contemplated within the scope of the embodiments of the invention.

Process 500 determines whether more active business objects remain in the business entity with which listeners have to be associated (step 510). If more active business objects remain ("Yes" path of step 510), process 500 selects an active business object with which a listener has not yet been associated (step 512). Process 500 returns to step 506.

If all active business objects in the business entity have been associated with suitable number of listeners ("No" path of step 510), process 500 proceeds to listen to the events being generated in the business entity (step 514). Process 500 exits at exit point marked "A" to enter another process, such as process 600 in FIG. 6, at a corresponding entry point marked "A" in the other process.

Figure 6:
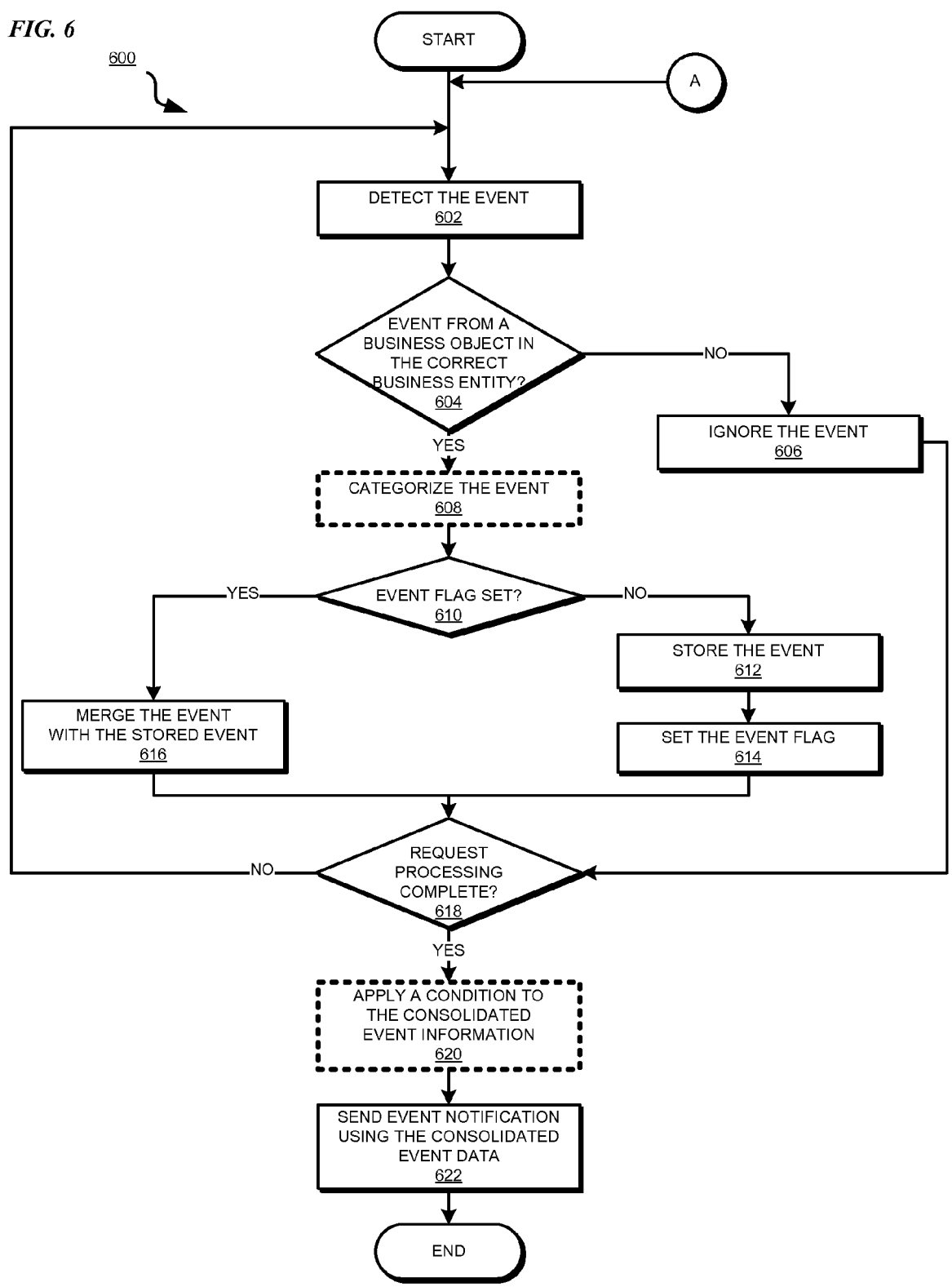
FIG. 6 depicts a flowchart of a process of managing events generated from business objects in accordance with an illustrative embodiment.

With reference to FIG. 6, this figure depicts a flowchart of a process of managing events generated from business objects in accordance with an illustrative embodiment. Process 600 may be implemented in an event management application, such as event management application 410 in FIG. 4.

Process 600 begins by detecting an event (step 602). Another process, such as process 500 in FIG. 5 may enter at step 602 through entry point marked "A" as well. Process 600 determines whether the event is from a business object in the correct business entity (step 604). For example, process 600 may compare the object path and the relationship path in the event with the object path and relationship path of the corresponding object in the business entity whose events are being consolidated. If the paths match, the event is from a business object in the correct business entity, otherwise not.

If the event is not from the correct business object ("No" path of step 604), process 600 ignore the event (step 606). Process 600 proceeds to step 618 thereafter.

If the event is from the correct business object in the correct business entity ("Yes" path of step 604), process 600 may optionally categorize the event (step 608). For example, when process 600 is being used for generating a single event for each request, step 608 may be omitted. When process 600 is being used for generating a single event per category per request, step 608 may categorize the events and consolidate them as described earlier.

Process 600 determines whether the event flag, such as flag 464 in FIG. 4, is set (step 610). If the flag is not set ("No" path of step 610), process 600 stores the event by storing the data in the changed state that resulted in the event (step 612). Process 600 sets the event flag (step 614).

If the event flag is set ("Yes" path of step 610), process 600 merges the event with the stored event, such as by merging the changed data with the changed data resulting from the previous events (step 616). Process 600 determines whether the processing of the request is complete (step 618). If the processing is not complete ("No" path of step 618), process 600 returns to step 602 and continues monitoring the events.

If the processing of the request is complete ("Yes"' path of step 618), process 600 may optionally apply a rule or a condition to the consolidated event data (step 620). For example, a consumer application may want the event notification to be treated in a specific manner based on the contents of the event data once the event data has been consolidated. The condition applied in step 620 may take any suitable form, including but not limited to code or logic, and may be provided to process 600 by any source, including but not limited to consumer applications.

Process 600 sends or published the event notification using the consolidated event data (step 622). Process 600 ends thereafter.

Figure 7:
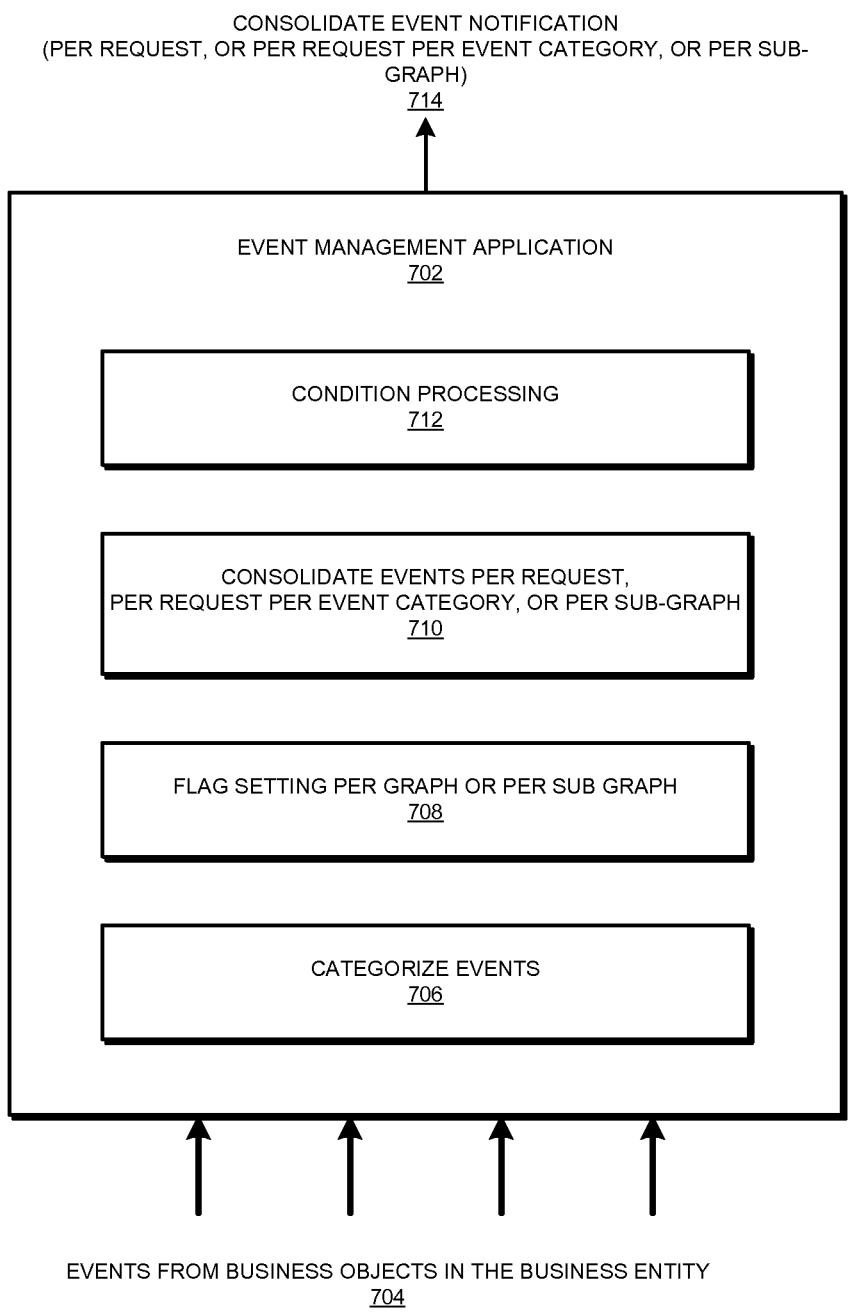
FIG. 7 depicts a block diagram of an example event management application in accordance with an illustrative embodiment.

With reference to FIG. 7, this figure depicts a block diagram of an example event management application in accordance with an illustrative embodiment. Event management application 702 may be used as event management application 410 in FIG. 4, and for implementing processes 500 and 600 in FIGS. 5 and 6 respectively.

Event management application 702 receives events 704 from one or more business entities being monitored. Event management application 702 includes component 706 for categorizing the events into various categories, such as for consolidation by categories of events.

Event management application 702 further includes component 708 for setting the event flag, wherever the flag may be implemented as described earlier. In one embodiment, the flag may be associated with the entire graph of the business entity, such as at the root business object level. In another embodiment, more than one flags may be used, such as a flag at each sub-graph level, the sub-graph beginning at some business object in the graph and including all the parent-child relationships underneath.

Event management application 702 further includes component 710 for consolidating the events per request, or consolidating events per category per request, or per sub-part of the request as handled by a sub-graph. Component 712 provides the condition processing, such as in the optional step 620 in FIG. 6.

Event management application 702 publishes consolidated event notification 714 per request, per even category per request, or per sub-graph as event management application 702 may be configured. The publication may occur by any suitable means, including but not limited to data transmission over a data network. The publication may transmit the data in a changed state resulting from the request.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for managing events generated from business objects in a business transactions environment. Using an embodiment of the invention, the number of events published to consumer applications is greatly reduced in a business transactions environment. Consequently, the consumer applications do not have to receive or handle largely duplicative business data with only small amounts of changes resulting from each of the numerous events. An embodiment consolidates the changed states from the various events during the processing of a request, and sends a consolidated changed event data to the consumer applications. An embodiment thus reduces network congestion, workload on consumer applications, and code complexity to handle and evaluate each event at the consumer applications.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the invention has been presented for purposes of illustration and description, but is not intended to be exhaustive or limited to the embodiments of the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer usable program product comprising a computer usable storage device including computer usable code for managing events generated from business objects in a data processing system, the computer usable code comprising:
   computer usable code for detecting a first event, the first event being raised by a business object in a plurality of business objects configured in a business entity, the business entity executing in the data processing system and providing a function for processing a request;
   computer usable code for determining, by referencing an event flag, whether a second event has been detected prior to the first event and during the processing of the request;
   computer usable code for responsive to the determining being affirmative, combining a first event data associated with the first event with a second event data stored from the second event, the combining resulting in consolidated event data; and
   computer usable code for publishing the consolidated event data responsive to the request upon completing processing of the request.

2. The computer usable program product of claim 1, wherein changing of a transaction data due to the request gives rise to the first event, the first event including the transaction data in a changed state subsequent to the changing.

3. The computer usable program product of claim 1, wherein the detecting the first event comprises:
   computer usable code for associating a listener with the business object in the business entity; and
   computer usable code for uniquely identifying the business object in the business entity to the listener.

4. The computer usable program product of claim 1, further comprising:
   computer usable code for configuring the business object as an active business object, the active business object being permitted to raise events;
   computer usable code for configuring a second business object in the plurality of business objects as a passive business object, the passive business object being prevented from raising events.

5. The computer usable program product of claim 1, wherein the business object in the plurality of business objects is not configured to propagate the first event via a parent-child relationship with a second business object, and wherein the business object raises the first event upon detecting a change in a transaction data associated with the request as a result of a processing of the request by the business object.

6. The computer usable program product of claim 1, wherein the event flag is maintained relative to a root business object of a hierarchy of the plurality of business objects in the business entity.

7. The computer usable program product of claim 1, wherein the event flag is maintained relative to a child business object in the hierarchy, and wherein the event flag registers only those events that arise from those business objects that appear in a sub-graph below the child business object in the hierarchy.

8. The computer usable program product of claim 1, wherein the event flag is a non-persisted property of the root business object.

9. The computer usable program product of claim 1, wherein the combining results in merging a first change in a first transaction data that caused the first event with a second change in a second transaction data that caused the second event.

10. The computer usable program product of claim 1, wherein the business object participates in a second business entity, further comprising:
   computer usable code for checking whether the first event is raised by the business object in the business entity;
   computer usable code for ignoring the first event and omitting the combining responsive to the first event being raised by the business object in the second business entity.

11. The computer usable program product of claim 1, further comprising:
   computer usable code for categorizing the first event into one of a plurality of categories, wherein the combining results in a categorized consolidated event data by merging a first change in the transaction data that caused the first event with a second change in the transaction data that caused the second event such that the first event and the second event are in a common category.

12. The computer usable program product of claim 11, wherein the publishing comprises:
   computer usable code for publishing the categorized consolidated event data for each such category in the plurality of categories that includes at least one event during the processing of the request.

13. The computer usable program product of claim 1, wherein the computer usable code is stored in a data processing system, and wherein the computer usable code is transferred over a network from a remote data processing system.

14. The computer usable program product of claim 1, wherein the computer usable code is stored in a server data processing system, and wherein the computer usable code is downloaded over a network to a remote data processing system for use in a computer readable storage medium associated with the remote data processing system.

15. A data processing system for managing events generated from business objects in a data processing system, the data processing system comprising:
   a storage device including a storage medium, wherein the storage device stores computer usable program code; and
   a processor, wherein the processor executes the computer usable program code, and wherein the computer usable program code comprises:
   computer usable code for detecting a first event, the first event being raised by a business object in a plurality of business objects configured in a business entity, the business entity executing in the data processing system and providing a function for processing a request;
   computer usable code for determining, by referencing an event flag, whether a second event has been detected prior to the first event and during the processing of the request;
   computer usable code for responsive to the determining being affirmative, combining a first event data associated with the first event with a second event data stored from the second event, the combining resulting in consolidated event data; and
   computer usable code for publishing the consolidated event data responsive to the request upon completing processing of the request.

16. The data processing system of claim 15, wherein changing of a transaction data due to the request gives rise to the first event, the first event including the transaction data in a changed state subsequent to the changing.

17. The data processing system of claim 15, wherein the detecting the first event comprises:
   computer usable code for associating a listener with the business object in the business entity; and
   computer usable code for uniquely identifying the business object in the business entity to the listener.

18. The data processing system of claim 15, further comprising:
   computer usable code for configuring the business object as an active business object, the active business object being permitted to raise events;
   computer usable code for configuring a second business object in the plurality of business objects as a passive business object, the passive business object being prevented from raising events.

19. The data processing system of claim 15, wherein the business object in the plurality of business objects is not configured to propagate the first event via a parent-child relationship with a second business object, and wherein the business object raises the first event upon detecting a change in a transaction data associated with the request as a result of a processing of the request by the business object.

20. The data processing system of claim 15, wherein the event flag is maintained relative to a root business object of a hierarchy of the plurality of business objects in the business entity.

* * * * *